US012377523B2

(12) United States Patent
Leon

(10) Patent No.: US 12,377,523 B2
(45) Date of Patent: Aug. 5, 2025

(54) REINFORCED DEVICE FOR TEMPORARILY HOLDING AN OPENING ELEMENT IN AN AJAR POSITION

(71) Applicant: EXSTO THERMOPLASTICS, Romans-sur-Isère (FR)

(72) Inventor: Bertrand Leon, Tullins (FR)

(73) Assignee: EXSTO THERMOPLASTICS, Romans-sur-Isère (FR)

( * ) Notice: Subject to any disclaimer, the term of this patent is extended or adjusted under 35 U.S.C. 154(b) by 296 days.

(21) Appl. No.: 17/922,488

(22) PCT Filed: Apr. 27, 2021

(86) PCT No.: PCT/FR2021/050724
§ 371 (c)(1),
(2) Date: Oct. 31, 2022

(87) PCT Pub. No.: WO2021/219954
PCT Pub. Date: Nov. 4, 2021

(65) Prior Publication Data

US 2023/0202002 A1 Jun. 29, 2023

(30) Foreign Application Priority Data

Apr. 29, 2020 (FR) ....................................... 2004271

(51) Int. Cl.
*B25B 11/00* (2006.01)
*B25B 11/02* (2006.01)

(52) U.S. Cl.
CPC .................................... *B25B 11/02* (2013.01)

(58) Field of Classification Search
CPC ........... B25B 11/00; E05F 3/221; E05F 3/222
See application file for complete search history.

(56) References Cited

U.S. PATENT DOCUMENTS

| | | | | |
|---|---|---|---|---|
| 3,058,146 A * | 10/1962 | Harrison | E05F 3/02 | 403/41 |
| 4,109,950 A | 8/1978 | Amdal | | |
| 6,006,635 A * | 12/1999 | Stojkovic | E05B 79/04 | 81/484 |

(Continued)

FOREIGN PATENT DOCUMENTS

| | | |
|---|---|---|
| FR | 2 943 088 A1 | 9/2010 |
| WO | 2007/000524 A1 | 1/2007 |

OTHER PUBLICATIONS

Sep. 9, 2021 Search Report issued in International Patent Application No. PCT/FR2021/050724.

*Primary Examiner* — Lee D Wilson
(74) *Attorney, Agent, or Firm* — Oliff PLC

(57) ABSTRACT

A device for temporarily holding an opening element in an ajar position relative to a stationary element of a body of a vehicle, including a body provided with at least one mounting method, and a retaining method including a tab a first end of which is designed to cooperate with a first flange of a housing and a second end of which provides a junction with the body, wherein the tab includes, between the first end and the second end, an intermediate area including at least one section configured to distribute stresses applied to the tab when the device is moved to the ajar position or the fully open position.

10 Claims, 11 Drawing Sheets

(56) References Cited

U.S. PATENT DOCUMENTS

| | | | | |
|---|---|---|---|---|
| 6,092,271 | A * | 7/2000 | Stojkovic | E05B 17/06 269/904 |
| 6,109,601 | A * | 8/2000 | St. John, Sr. | B25B 5/006 269/71 |
| D782,264 | S * | 3/2017 | Erdman | D8/71 |
| 2003/0015135 | A1 | 1/2003 | Baisch | |
| 2009/0064458 | A1* | 3/2009 | Vanini | E05F 1/1261 16/304 |
| 2009/0133222 | A1* | 5/2009 | Ochiai | E05D 11/1057 16/347 |
| 2016/0145921 | A1* | 5/2016 | Laird | F16B 2/185 29/428 |

* cited by examiner

18a

18b

18c

REINFORCED DEVICE FOR TEMPORARILY HOLDING AN OPENING ELEMENT IN AN AJAR POSITION

The invention concerns the field of devices used during the assembly of a motor vehicle and more particularly a temporary device for holding in the ajar position an opening element with respect to a fixed element of a bodywork of the motor vehicle.

In a mounting line, opening elements of a motor vehicle, such as doors for example, are assembled to fixed elements, such as uprights of a body shell of the vehicle, thus forming the bodywork of said vehicle. The bodywork is then painted in a paint line.

The opening elements, not yet equipped with a closing device, or with latches, tend, by their weight and by the forces and shocks exerted by the assembly line during the movements of the body shells, to be placed in a position of opening relative to the fixed element. Now, both for optimizing the size of the mounting line and for optimum painting, the opening elements must be kept in an ajar position with respect to the fixed element.

Thus, it is necessary to set up temporary holding devices.

There is a known solution described in the patent document EP1893832 and shown in FIGS. 1 to 4, having a device 1' comprising a body 2' provided with mounting means 3', a retaining means comprising a tab 5' whose one first end 51' is designed to cooperate with a first flange of the housing, and whose second end 52' ensures a junction with the body 2', and an abutment 4' intended to cooperate with a second flange of a housing. The body 2' is extended, in a zone located substantially at the level of the second end 52' of the tab 5', by a plate 6' suspended above a recessed zone, the plate 6' and the tab 5' being connected by an arch 7 'ensuring a flexible connection.

The body 2' of the device is a non-deformable element of the device.

The temporary device 1' comprises a mounting means 3' making it possible to fix said device 1' to the opening element or to the fixed element of the vehicle bodywork. More particularly, the mounting means 3' comprises a base and fixing means.

The device 1' cooperates with a housing positioned directly on the element of the vehicle bodywork that does not comprise the device 1'. In other words, when the device 1' is fixed on the opening element, respectively the fixed element, the housing or the second part of the device 1' is positioned on the fixed element, respectively the opening element. Thus, the housing is positioned directly on the fixed element or on the opening element.

The device 1' is designed to be positioned on the opening element or on the fixed element so that when the opening element is brought closer to the fixed element, the opening element exerts forces on the retaining means. Thus, stresses, consequences of the forces induced in the retaining means, are exerted on the retaining means. Under the effect of the forces exerted by the opening element, the retaining means deforms elastically under the action of the stresses then disappears so that the device 1' is introduced into the housing, then the retaining means elastically returns to its initial position. Thus, the device 1' is introduced into the housing and the device 1' holds the opening element in the ajar position with respect to the fixed element. In this position and due to functional clearance, the device 1' can be in three situations:

- only the abutment 4' is in contact with the second edge of the housing;
- only the retaining means is in contact with the first flange;
- neither the abutment 4' nor the retaining means are in contact with the housing.

The ajar position is reached when device 1' is inserted into the housing. The opening position is reached when there is no mechanical link between the device 1' and the housing.

More precisely, FIG. 1 illustrates three kinematic views of the device 1' according to the state of the art when an opening element is brought close to a fixed element so as to be placed in an ajar position, that is to say when the opening element moves from an opening position to an ajar position. FIG. 1*a* shows a hook EO representing the opening element and subsequently named the opening element, before contact with the tab 5' of the device 1' which is therefore in an opening position, then FIGS. 1*b* and 1*c* illustrate the deformation of the device 1' of the state of the art when the opening element EO is positioned in the ajar position.

FIG. 3 illustrates four kinematic views of the device 1' according to the state of the art when the opening element EO is moved away from the fixed element so as to be placed in an opening position. FIG. 3*a* shows the opening element EO in the ajar position, then FIGS. 3*b*, 3*c* and 3*d* illustrate the deformation of the device 1' of the state of the art when the opening element EO passes from the ajar position to the opening position.

The described device 1' makes it possible to effectively hold an opening element in the ajar position with respect to a fixed element of a vehicle. However, with repeated use of the device 1', it degrades and breaks. Thus, manufacturers wish to improve the lifetime of the device 1'.

A study of the stresses applied to the devices 1' of the state of the art when placed in the ajar position, as illustrated in FIG. 2, and when placed in the opening position, such as illustrated in FIG. 4, shows three main stress concentration zones, that is to say zones in which the stress levels are the highest.

A first stress concentration zone 8' is located at the junction of the second end 52' of the tab 5' and the body 2', precisely at the level of the junction edge formed between the second end 52' and the body 2'. Indeed, the tab 5' and the body 2' form an angle at which the stresses are concentrated.

A second stress concentration zone 9' is positioned at the junction of the plate 6' and the body 2', precisely at the junction edge formed between the plate 6' and the body 2'. Indeed, the plate 6' and the body 2' form an angle at which the stresses are concentrated.

Finally, a third stress concentration zone 10' appears at the junction between the tab 5' and the arch 7'. Indeed, the arch 7' and the tab 5' form an angle at which the stresses are concentrated.

During prolonged use of a device 1' according to the state of the art, a break or in other words a fatigue crack may appear at the level of one of the three stress concentration zones 8', 9', 10'.

Furthermore, the device 1' has connecting angles between the plate 6', the arch 7' and the tab 5' which tend to retain the paint and to project the latter during a subsequent manipulation of the device 1'. Thus, a projection of paint droplets can create appearance defects when the opening element moves from an opening position to an ajar position, or vice versa.

Finally, a size of the device 1' can generate a shadow effect on the surface to be painted, thus creating an appearance defect.

The object of the invention is to extend the usage time of a device by proposing a temporary device for holding in an ajar position an opening element with respect to a fixed element of a vehicle bodywork, comprising a body provided with at least one mounting means, and a retaining means comprising a tab whose first end is designed to cooperate with a first flange of a housing and whose second end ensures a junction with the body, characterized in that the tab comprises, disposed between the first end and the second end, an intermediate zone comprising at least one section configured to distribute the stresses applied to the tab when placed in the ajar position or in the opening position of the device.

According to the invention, the housing can be directly integrated on the opening element or the fixed element of the bodywork or else be positioned on an interface which will itself be fixed on the bodywork.

When placing the device in the ajar position or in the opening position, forces are exerted on the device. More precisely, the tab is subjected to stresses which lead to an elastic deformation of the latter. In other words, the tab absorbs part of the stresses.

The stresses absorbed by the tab are mainly applied to the section and no longer essentially to an angle or a junction edge as in the state of the art. Thus, the stresses applied to the second end are lessened, because they are distributed over the entire section, which limits the risk of breakage.

It should be noted that the stresses are applied to a major part of the surface of the section. In other words, the section comprises a large surface for applying the stresses, ultimately making it possible to absorb and distribute a large part of the forces exerted on the device. As a result, the stresses applied to the section are distributed over the whole of the application surface so that the maximum level of stress applied to the section is weakened and cannot lead to breakage of the device.

It should be noted that the section being separate from the second end, the device has a dissociation of the stress concentration zones to be absorbed by the tab. In fact, the stresses for holding the tab on the body are exerted at the level of the junction of the body and of the second end, while the stresses linked to the elastic deformation of the tab are exerted at the level of the section. Each of these stress concentration zones receives part of the stresses absorbed by the tab. The stresses are therefore distributed in the tab in a more homogeneous manner than in the state of the art, thus limiting the risk of breakage liable to occur at the level of the various stress concentration zones.

Finally, the intermediate zone is arranged so that the stresses absorbed by the tab when placing the device in the ajar position or in the opening position are exerted mainly at the level of the section which is separated from the second end. The section is designed to receive and absorb most of the stresses absorbed by the tab.

The presence of an intermediate zone of the device reduces the level of stresses applied to the tab compared to the state of the art by modifying, and more precisely by shifting and distributing, the stresses absorbed by the tab. In this way, a fatigue phenomenon, appearing when the device is repeatedly subjected to a high level of stress, appears later than in a device of the state of the art, or even does not appear.

A usage time of the device is thus extended.

According to a characteristic of the invention, the device comprises an abutment designed to cooperate with a second flange of the housing.

Thus, the device comprises an abutment which makes it possible to limit a closing movement of the opening element.

According to an embodiment, the abutment can be connected to the body.

According to another embodiment, the device comprises a first member comprising the retaining element and a second member comprising the abutment, the first member being independent of the second member.

Thus, the first member makes it possible to limit the opening movement of the opening element while the second member makes it possible to limit the closing movement of the opening element.

The independence of the first member with respect to the second member makes it possible to position independently of each other.

According to a characteristic of the invention, the section has a curved shape.

The curved shape makes it possible to increase the surface of application of the stresses of the section so as to better distribute the stresses absorbed by the tab and therefore to improve the usage time of the device.

In this way, a phenomenon of fatigue appears later, or even does not appear. The usage time of the device is extended.

According to a characteristic of the invention, the section has a concave shape with respect to a plane in which the tab extends.

In other words, the section has a hollow shape facing the abutment.

Thus, the section is particularly suitable for concentrating and absorbing the stresses when the device is placed in the ajar position.

According to a characteristic of the invention, the section has a convex shape with respect to a plane in which the tab extends.

In other words, the section has a protrusion facing the abutment.

Thus, the section is particularly suitable for distributing and absorbing the stresses when the device is placed in the opening position.

According to a characteristic of the invention, the second end is oriented along an axis of elongation of the abutment.

The elongation axis of the abutment is the axis along which a force is exerted on the abutment.

Thus, the second end is optimally oriented in order to distribute the stresses exerted on the device according to the invention.

According to a characteristic of the invention, the second end of the tab is connected to the body so as to extend a plane thereof.

Thus, the tab is connected to the body without having an angle or a junction edge that can concentrate the stresses. There is no clear demarcation between the body and the tab.

According to a characteristic of the invention, the device further comprises at least one elastic deformation element which is connected to the tab and to the body.

When placing the device in the ajar position or in the opening position, forces are exerted on the device. More precisely, the tab and the elastic deformation element are subjected to stresses which lead to elastic deformation thereof. In other words, the tab and the elastic deformation element absorb part of the stresses.

According to a characteristic of the invention, a fillet connecting the elastic deformation element to the tab comprises a radius of curvature of at least 2 mm.

According to a characteristic of the invention, a fillet connecting the elastic deformation element to the body comprises a radius of curvature of at least 2 mm.

Thus, the constituent elements of the device are far enough apart from each other to eliminate the retentions or accumulations of paint.

According to a characteristic of the invention, the elastic deformation element comprises at least one curved element configured to absorb part of the stresses applied to the elastic deformation element when placed in the ajar position or in the opening position of the device.

The stresses absorbed by the elastic deformation element are applied to several zones including the zone formed by the curved element. Thus, the device has at least one stress application zone more than compared to the device of the state of the art. Thus, there is a better distribution of the stresses and a reduction in the stresses applying to the junction between the body and the elastic deformation element and to the junction between the tab and the elastic deformation element. There is no more risk of breakage.

Furthermore, the curved shape makes it possible to increase the stress application surface so as to better distribute the stresses absorbed by the elastic deformation element and therefore to improve the lifetime of the device.

The presence of a curved element reduces the level of stresses applied to the elastic deformation element compared to the state of the art by modifying, and more precisely by shifting and distributing, the stresses absorbed by the elastic deformation element.

The curved element also makes it possible to move the constituent elements of the device, and more particularly the tab, away from the body so as to eliminate paint retentions that can cause paint to splash when the opening element moves from an opening position to an ajar position, or vice versa. The curved element also makes it possible to reduce the size of the device compared to a device of the state of the art, which thus avoids a defect in appearance.

According to a characteristic of the invention, the curved element comprises a radius of curvature of at least 2 mm.

Thus, the constituent elements of the device are far enough apart from each other to eliminate the retentions or accumulations of paint.

According to a characteristic of the invention, the curved element is positioned between the junction of the body and of the elastic deformation element, and the junction of the tab and of the elastic deformation element.

According to a characteristic of the invention, the curved element is positioned between a first segment and a second segment so as to form a gripper.

In this way the elastic deformation element is configured to deform in the manner of a clamp, the two segments approaching or moving away depending on whether the device is placed in the ajar position or on the contrary in the opening position.

According to a characteristic of the invention, the curved element comprises at least one alternation of a concave element and of a convex element with respect to a plane in which the curved element extends.

In this way, the curved element acts as a spring by absorbing the stresses exerted on the elastic deformation element.

According to a characteristic of the invention, the curved element comprises a plurality of concave element and convex element.

According to a characteristic of the invention, the elastic deformation element is connected to the body at a distance from the junction between the second end of the tab and the body.

Thus, there is not a concentration of the stresses in one zone of the device but a distribution thereof.

According to a characteristic of the invention, the elastic deformation element, the body and the tab define an outline of a recessed closed surface.

Thus, the stresses exerted on the device when placed in the ajar position or in the opening position will be distributed over the entire contour of the surface so as to deform the surface.

The invention also relates to a vehicle provided with at least one device according to the invention.

The invention will be better understood, thanks to the description below, which relates to several embodiments according to the present invention, given by way of non-limiting examples and explained with reference to the appended schematic drawings, in which.

FIGS. 1 to 4 present a device 1' according to the state of the art and are described in the introductory part.

In the following, identical elements of different embodiments carry identical numbers.

Figure 1:
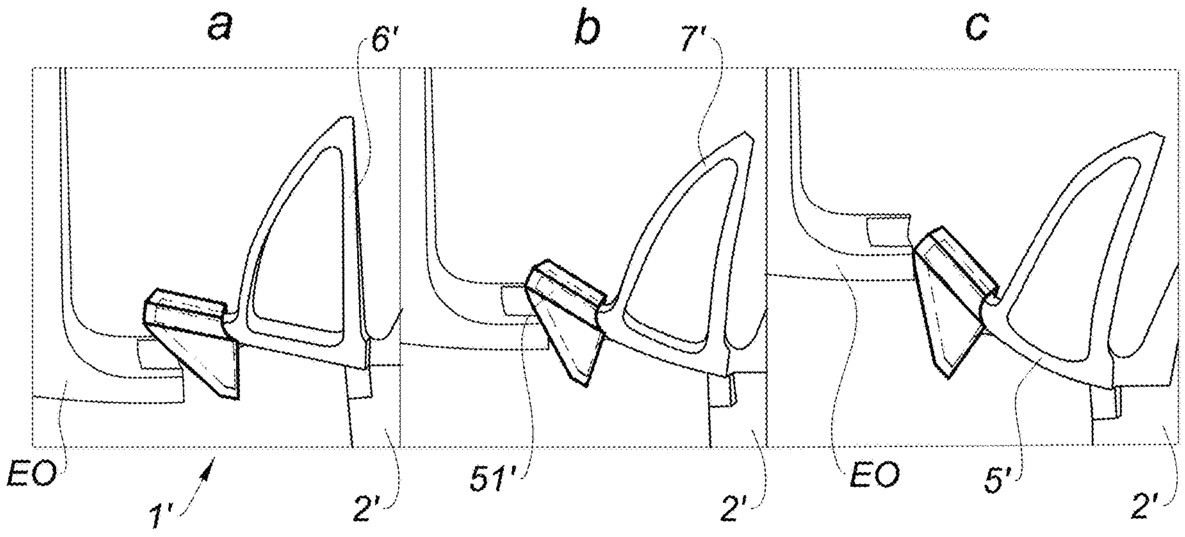
FIG. 1 is a kinematic view of a device according to the state of the art when placed in the ajar position.
Figure 2:
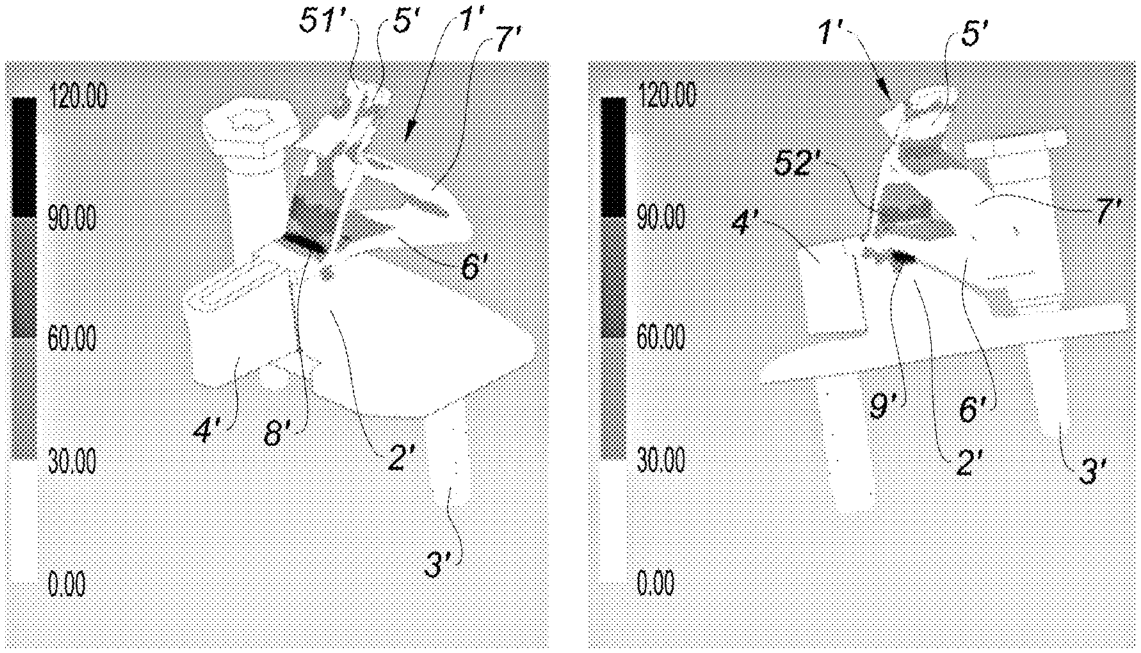
FIG. 2 is a view of the stresses according to the criteria of Von Mises in MPa exerted on the device of the state of the art when placed in the ajar position.
Figure 3:
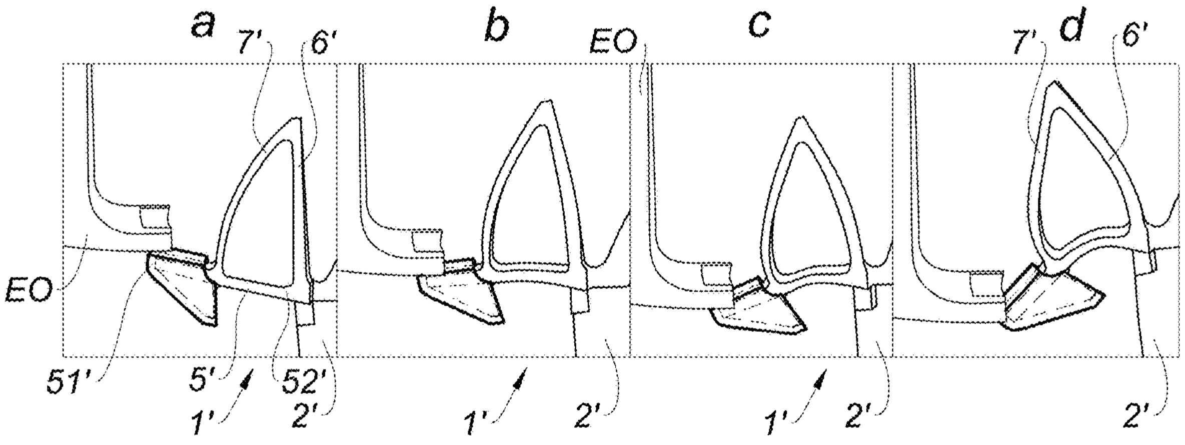
FIG. 3 is a kinematic view of the device according to the state of the art when placed in the opening position.
Figure 4:
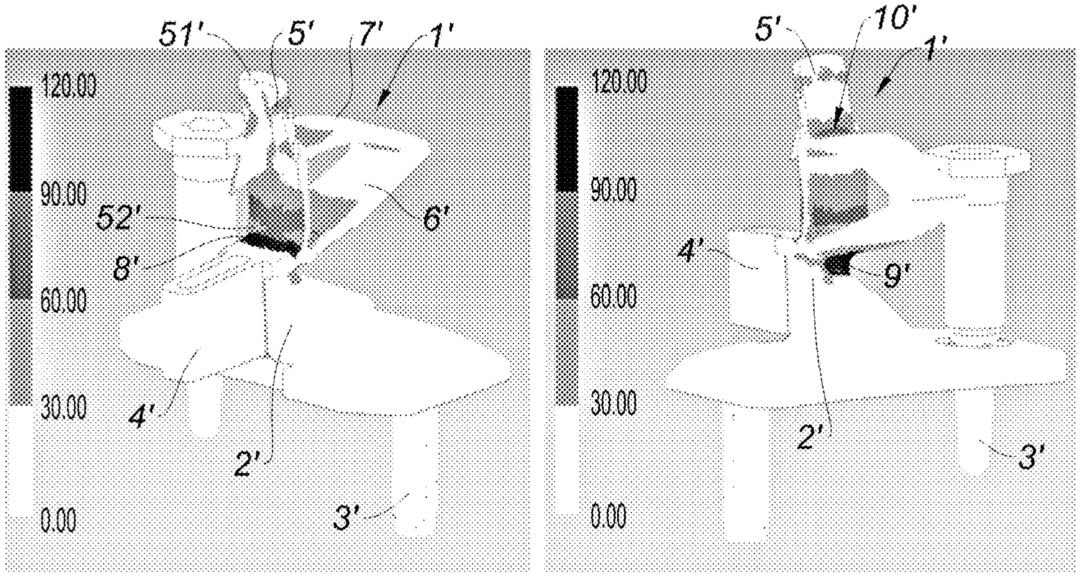
FIG. 4 is a view of the stresses according to the criteria of Von Mises in MPa exerted on the device of the state of the art during a setting in opening position.
Figure 5:
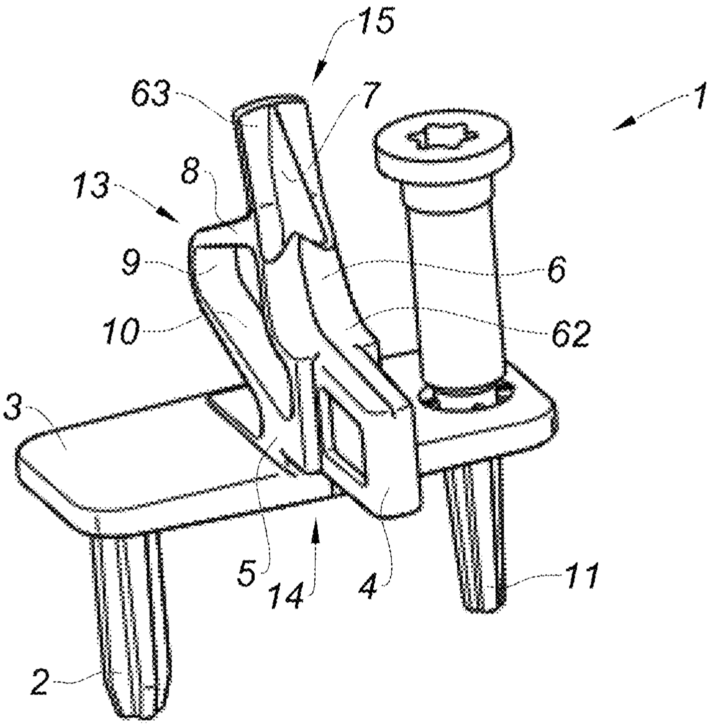
FIG. 5 is a representation in perspective of a first embodiment of a device according to the invention.
Figure 6:
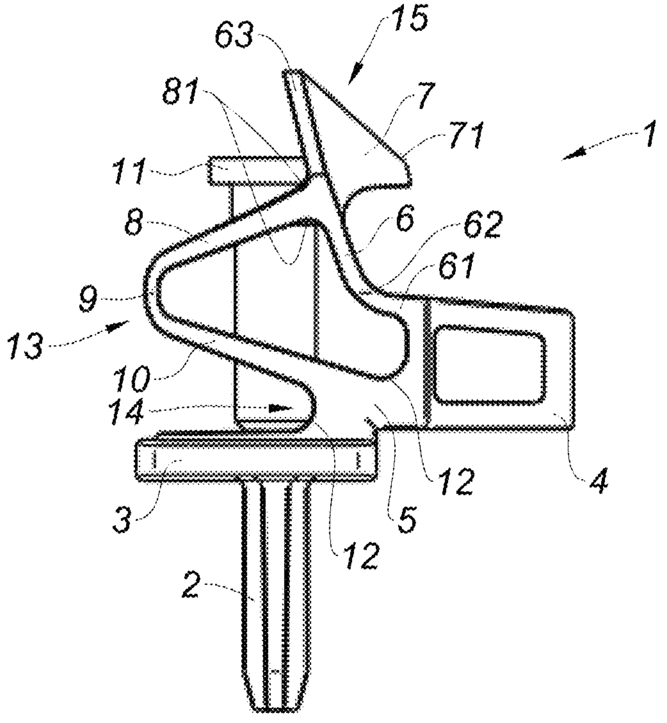
FIG. 6 is a lateral representation of the device according to the first embodiment.

FIGS. 5 and 6 represent a device 1 according to a first embodiment of the invention comprising a body 14 provided on the one hand with a base 3 and on the other hand with a junction part 5.

The base 3 of the body 14 has a substantially planar shape and comprises mounting means which are fixing means such as a screw 11 and a centering pin 2.

The junction part 5 extends in a plane substantially perpendicular to the base 3 of the body 14 and substantially in the middle thereof. The junction part 5 is extended by an elastic deformation element 13, a retaining means 15 and an abutment 4. The abutment 4 has a substantially rectangular shape and has elastic properties. The abutment 4 extends in the plane of the junction part 5 at a distance from the latter.

According to a characteristic of the invention, the abutment 4 has any shape favouring the elastic properties thereof.

The retaining means 15 comprises a tab 6 and an extension 7.

The extension 7 has a substantially triangular shape, whose first side is in contact with the tab 6, a first vertex of the extension 7 is facing a first end 63 of the tab 6 and a second vertex is facing the abutment 4. The extension 7 forms a ramp 71 from the first end 63 of the tab 6 and joins the tab 6 substantially in the middle thereof by a curved shape having a radius of curvature of at least 2 mm. Thus, a third vertex of extension 7 is substantially in the middle of the tab 6.

The first end 63 of the tab 6 is designed to cooperate with a first flange 53*a* of a housing 53. The tab 6 further comprises an intermediate zone 62 and a second end 61 providing a junction of the tab 6 to the body 14 at the level of the junction part 5 so that the second end 61 extends a plane of the junction part 5.

The intermediate zone 62 comprises a section configured to distribute the stresses applied to the tab 6 when placed in the ajar position or in the opening position of the device 1. The section has a concave curved shape with respect to a plane in which extends the tab 6.

The tab 6 is extended substantially in the middle, and at the base of the extension 7, by the elastic deformation element 13. The elastic deformation element 13 is connected on the one hand to the tab 6 by two fillets 81, that is to say by a rounded connection at the meeting of two flat surfaces, having a radius of curvature greater than 2 mm and on the other hand to the body 14 by two fillets 12 having a radius of curvature greater than 2 mm. The elastic deformation element 13 is connected to the body 14 at a distance from the junction between the second end 61 of the tab 6 and the body 14.

The deformation element 13 comprises a curved element 9 configured to distribute part of the stresses applied to the elastic deformation element 13 when placed in the ajar position or in the opening position of the device 1.

The curved element 9 is positioned between a first segment 8 and a second segment 10 so as to form a gripper. The curved element has a radius of curvature of at least 2 mm.

The tab 6, the elastic deformation element 13, the abutment 4 and the junction part 5 extend in a first plane substantially perpendicular to the plane in which the base 3 of the body 14 extends.

The tab 6, the elastic deformation element 13, and the junction part 5 delimit a contour of a recessed closed surface.

Figure 7:
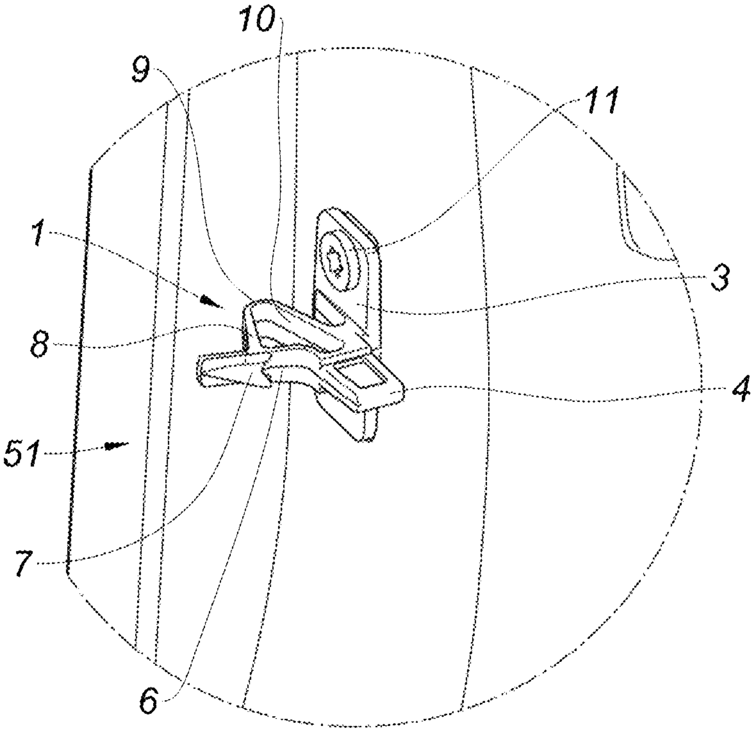
FIG. 7 is a representation of the device according to the first embodiment positioned on a fixed element of a vehicle.

FIG. 7 represents the device 1 fixed to a fixed element 51 of a vehicle. For this, the centering pin 2 of the base 3 has been introduced into a threaded hole and the screw 11 makes it possible to hold the device 1 against the fixed element 51.

By defining that an interior part of the vehicle corresponds to the volume delimited by the bodywork of the vehicle and that an external part corresponds to the environment surrounding the bodywork, the device 1 is positioned so that the abutment 4 faces the external part of the vehicle.

An opening element 52 of the vehicle comprises the housing 53.

Figure 8:
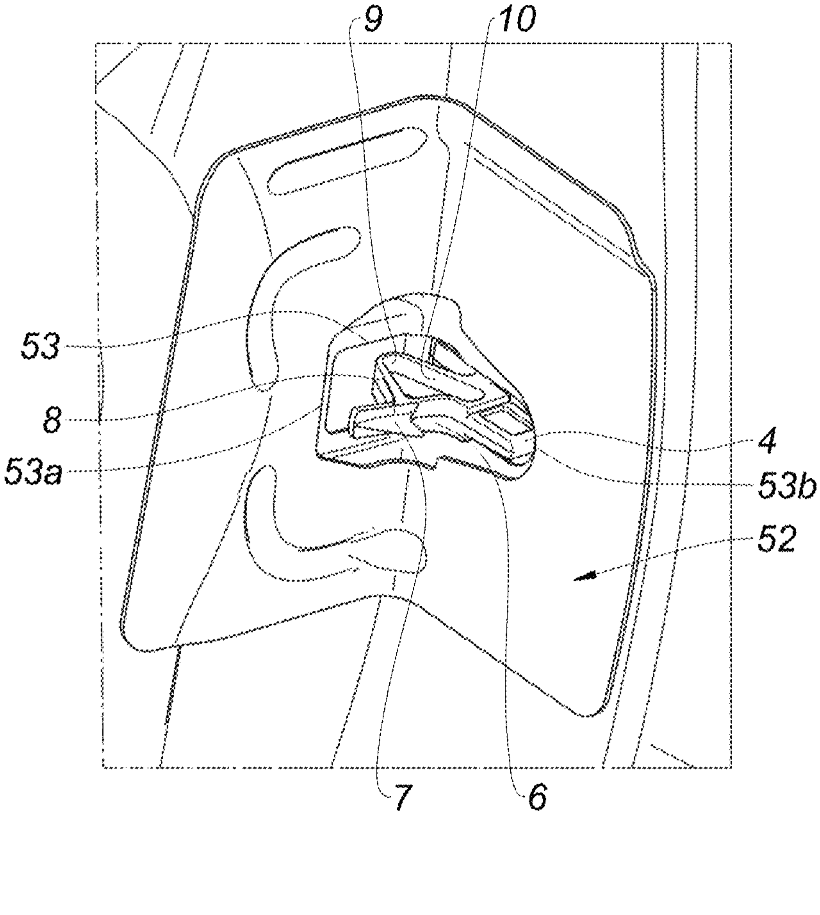
FIG. 8 is a view of the device according to the first embodiment fixed to the fixed element of the vehicle while an opening element is in an ajar position, an external cover sheet of the opening element not being shown.

When the opening element 52 is brought closer to the fixed element 51, the opening element 52, via the first flange 53*a* of the housing 53, comes into contact with the extension 7, and exerts stresses, lower than the limit of elasticity of the device 1, on the retaining means 15 which is elastically deformed. The retaining means 15 disappears so that the device 1 is introduced into the housing 53, then the retaining means returns elastically to its initial position. Thus, the device 1 is introduced into the housing 53 as shown in FIG. 8. In this position and due to a functional game, the device 1 can be in three situations:

- only the abutment 4 is in contact with a second flange 53*b* of the housing 53;
- only the retaining means 15 is in contact with the first flange 53*a;*
- neither the abutment 4 nor the retaining means 15 are in contact with the housing 53.

Figure 9:
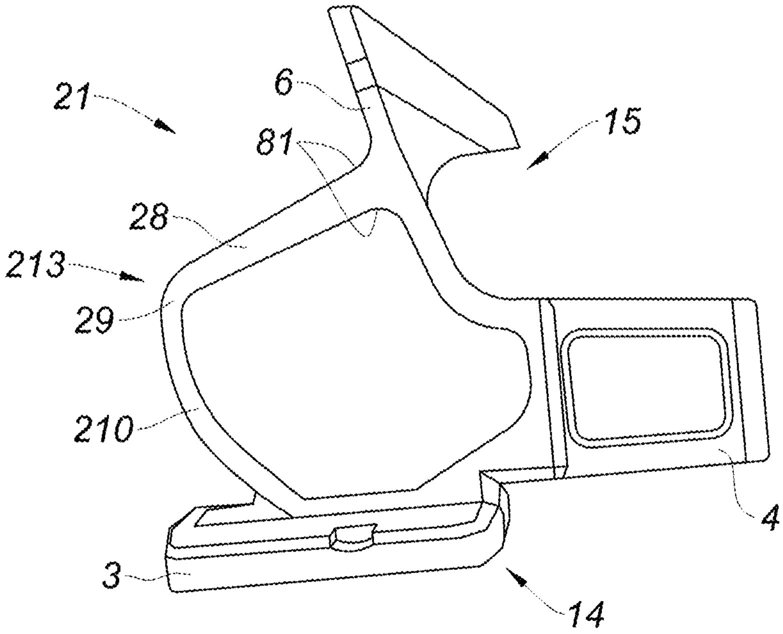
FIG. 9 is a lateral representation of a second embodiment of a device according to the invention.

FIG. 9 represents a device 21 according to a second embodiment. The device 21 has a body 14, an abutment 4 and a retaining means 15 identical to device 1. Only the elastic deformation element 213 differs from device 1.

The elastic deformation element 213 is connected on the one hand to the tab 6 by two fillets 81, and on the other hand to the body 14 and more precisely to the base 3 of the body 14. The deformation element 213 comprises a curved element 29 configured to absorb some of the stresses applied to the elastic deformation element 213 when the device 21 is placed in the ajar position or in the opening position. The curved element 29 is positioned between a first segment 28 and a curved part 210.

Figure 10:
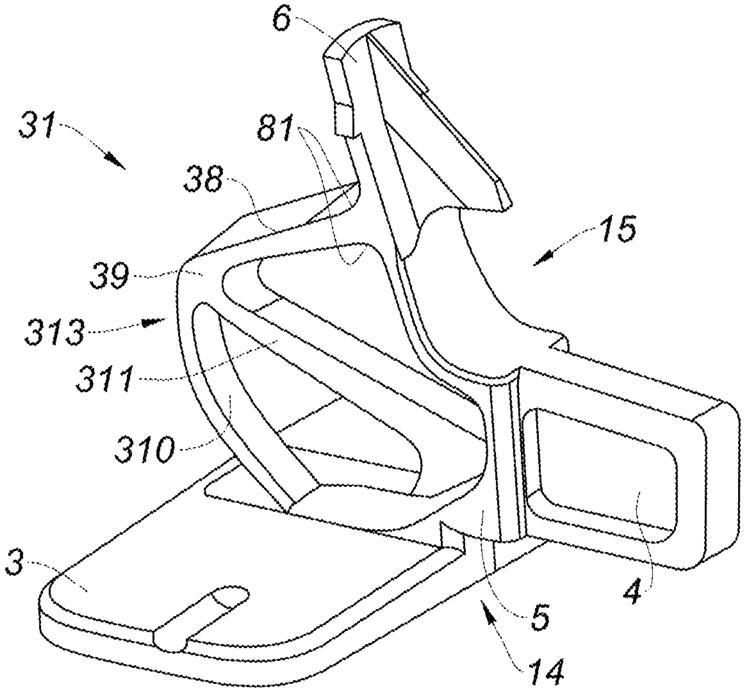
FIG. 10 is a representation in perspective of a third embodiment of a device according to the invention.

FIG. 10 is a representation in perspective of a third embodiment of a device 31 according to the invention. The device 31 has a body 14, an abutment 4 and a retaining means 15 identical to the device 1. Only the elastic deformation element 313 differs from device 1.

The elastic deformation element 313 is connected on the one hand to the tab 6 by two fillets 81, and on the other hand to the body 14 in two zones. The first zone is located on the base 3 of the body 14, the second zone is located at the intersection between the base 3 and the junction part 5.

The deformation element 313 comprises a curved element 39 configured to distribute some of the stresses applied to the elastic deformation element 313 when placed in the ajar position or in the opening position of the device 31. The curved element 39 is positioned between a first segment 38 and a curved element 310. An extension 311 connects the curved element 39 to the second zone.

Figure 11:
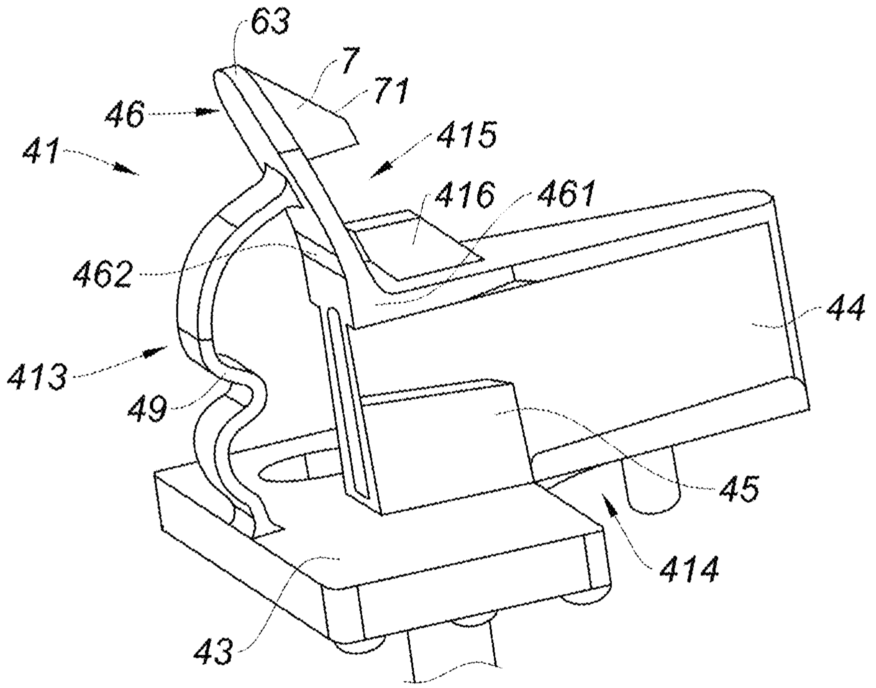
FIG. 11 is a representation in perspective of a fourth embodiment of a device according to the invention.

FIG. 11 represents a device 41 according to a fourth embodiment. The device 41 has a body 414 comprising a base 43 and a junction part 45. The junction part 45 is extended by an abutment 44 and a retaining means 415.

The abutment 44 has elastic properties. The abutment 44 extends in the plane of the junction part 45 at a distance from the latter.

According to a characteristic of the invention, the abutment 44 has any shape favouring the elastic properties thereof.

The retaining means 415 comprises a tab 46, an extension 7 and a support element 416.

The extension 7 has a substantially triangular shape whose first side is in contact with the tab 46, a first vertex of the extension 7 is facing a first end 63 of the tab 46 and a second vertex is facing the abutment 44. The extension 7 forms a ramp 71 from the first end 63 of the tab 6 and joins the tab 46 substantially in the middle thereof by a curved shape. Thus, a third vertex of the extension 7 is substantially in the middle of the tab 46.

The first end 63 of the tab 46 is designed to cooperate with a first flange 53*a* of a housing 53. The tab 46 further comprises an intermediate zone 462 and a second end 461 providing a junction of the tab 46 to the body 414 at the level of the junction part 45 so that the second end 461 extends a plane of the junction part 45.

The intermediate zone 462 comprises a section configured to distribute the stresses applied to the tab 46 when placed in the ajar position or in the opening position of the device 41.

According to a characteristic of the invention, the section of the intermediate zone 462 is made of a different material from that of the tab 46.

The section has a convex curved shape with respect to a plane in which the tab 46 extends.

The support element 416 is attached to the junction part 45. It extends perpendicular to the junction part 45 so that the tab 46 comes into contact with the latter when the tab 46 is placed in the opening position. The support element 416 absorbs, by contact, part of the stresses applied to the tab 46 when placed in the opening position.

The tab 46 is extended substantially in the middle, and at the base of the extension 7, by the elastic deformation element 413. The elastic deformation element 413 is connected on the one hand to the tab 46, and on the other hand to the base 43.

The deformation element 413 comprises a curved element 49 configured to absorb part of the stresses applied to the elastic deformation element 413 when placed in the ajar position or in the opening position of the device 41. The curved element 49 comprises an alternation of a concave element and of a convex element with respect to a plane in which the curved element 49 extends. The curved element 49 forms a spring.

The tab 46, the elastic deformation element 413, the abutment 44 and the junction part 45 extend in a first plane substantially perpendicular to the plane in which the base 43 of the body 414 extends.

The tab 46, the elastic deformation element 413, the base 43 and the junction part 45 delimit a contour of a recessed closed surface.

Figure 12:
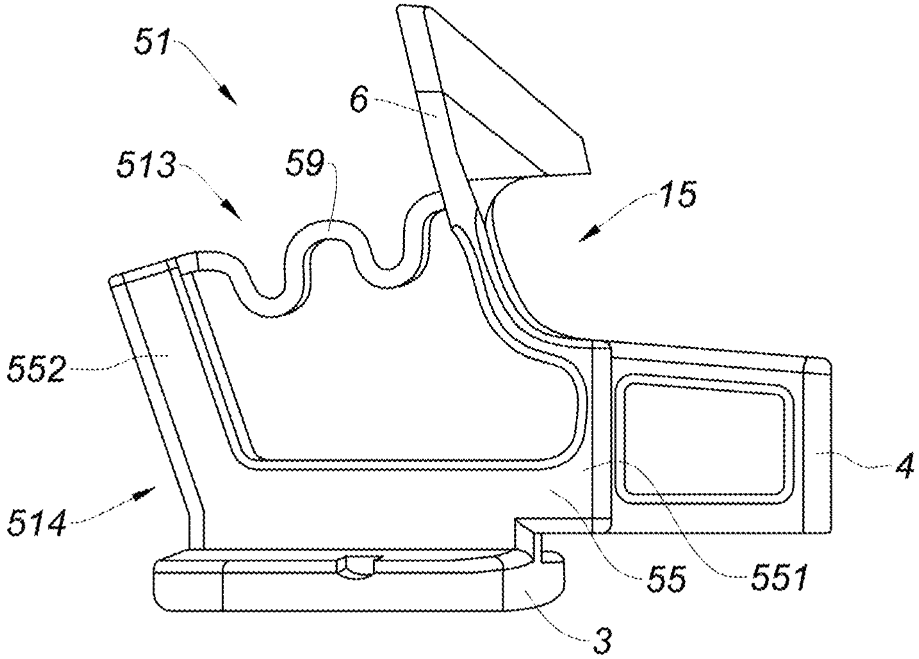
FIG. 12 is a lateral representation of a fifth embodiment of a device according to the invention.

FIG. 12 is a lateral representation of a fifth embodiment of a device 51 according to the invention. The device 51 has an abutment 4 and a retaining means 15 identical to the device 1. Only the body 514, and the elastic deformation element 513 differ from the device 1.

The body 514 has a base 3 and a junction part 55 which extends perpendicular to the base 3. The junction part 55 comprises a first elongation 551 to which the abutment 4 and the tab 15 are attached, and a second elongation 552 to which the elastic deformation element 513 is attached.

The elastic deformation element 513 is connected on the one hand to the tab 6, and on the other hand to the second elongation 552.

The deformation element 513 comprises a curved element 59 configured to distribute some of the stresses applied to the elastic deformation element 513 when placing the device 51 in the ajar position or in the opening position. The curved element 59 comprises an alternation of a plurality of concave elements and convex elements with respect to a plane in which the curved element 59 extends. The curved element 59 forms a spring.

The tab 6, the elastic deformation element 513, and the junction part 55 delimit a contour of a recessed closed surface.

Figure 13:
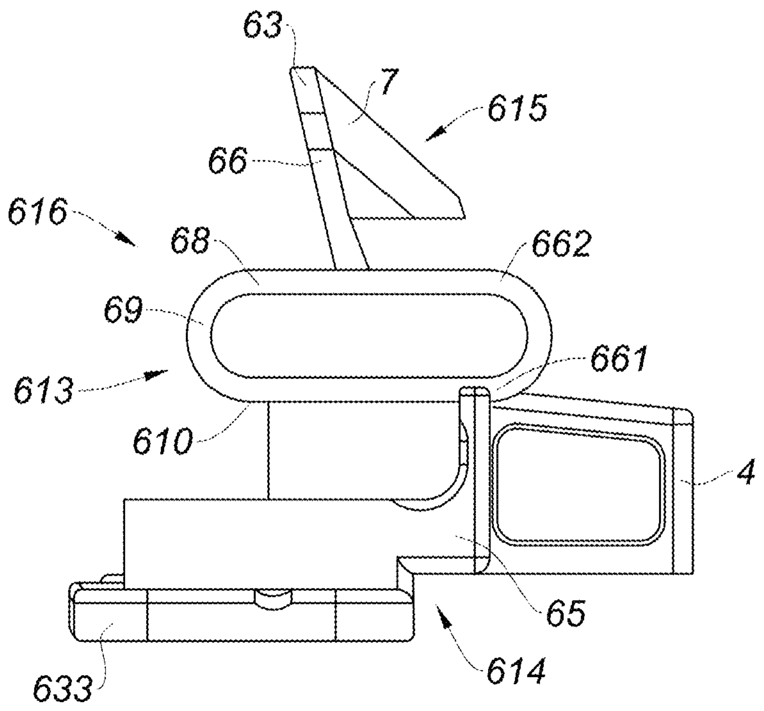
FIG. 13 is a lateral representation of a sixth embodiment of a device according to the invention.

FIG. 13 is a lateral representation of a sixth embodiment of a device 616 according to the invention. The device 616 has a body 614 comprising a base 633 and a junction part 65. The junction part 65 is extended by an abutment 4 and an elastic deformation element 613 to which a retaining means 615 is fixed.

The retaining means 615 comprises a tab 66, and an extension 7.

The first end 63 of the tab 66 is designed to cooperate with a first flange 53*a* of a housing 53. The tab 66 further comprises an intermediate zone 662 and a second end 661 providing a junction of the tab 66 to the body 614 at the level of the junction part 65. The intermediate zone 662 comprises a section having a convex curved shape with respect to the plane in which the tab extends. The section is configured to distribute the stresses applied to the tab 66 when placed in the ajar position or in the opening position of the device 616.

The elastic deformation element 613 is connected on the one hand to the tab 66, and on the other hand to the body 614.

The deformation element 613 comprises a curved element 69 configured to distribute part of the stresses applied to the elastic deformation element 613 when placed in the ajar position or in the opening position of the device 616. The curved element 69 is positioned at each end of a first segment 68 and a second segment 610 so as to form a gripper at each end of the segments.

The tab 66, the elastic deformation element 613, the abutment 4 and the junction part 65 extend in a first plane substantially perpendicular to the plane in which the base 633 of the body 614 extends.

The elastic deformation element 613 and the intermediate zone 662 delimit a contour of a recessed closed surface.

Figure 14:
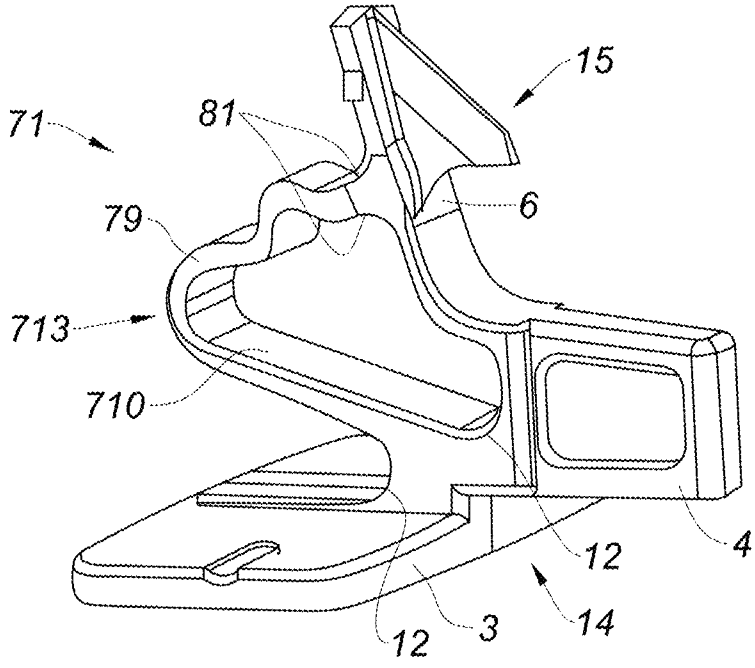
FIG. 14 is a representation in perspective of a seventh embodiment of a device according to the invention.

FIG. 14 is a representation in perspective of a seventh embodiment of a device 71 according to the invention. The device 71 has a body 14, an abutment 4 and a retaining means 15 identical to device 1. Only the elastic deformation element 713 differs from device 1.

The elastic deformation element 713 is connected on the one hand to the tab 6 by two fillets 81, and on the other hand to the body 14 and more precisely to the base 3 of the body 14 by two fillets 12.

The deformation element 713 comprises a curved element 79 configured to distribute part of the stresses applied to the elastic deformation element 713 when placed in the ajar position or in the opening position of the device 71. The curved element 79 is positioned between the tab 6 and a segment 710. The curved element 79 comprises an alternation of a plurality of concave elements and convex elements with respect to a plane in which the curved element 79 extends. The curved element 79 forms a spring.

Figure 15:
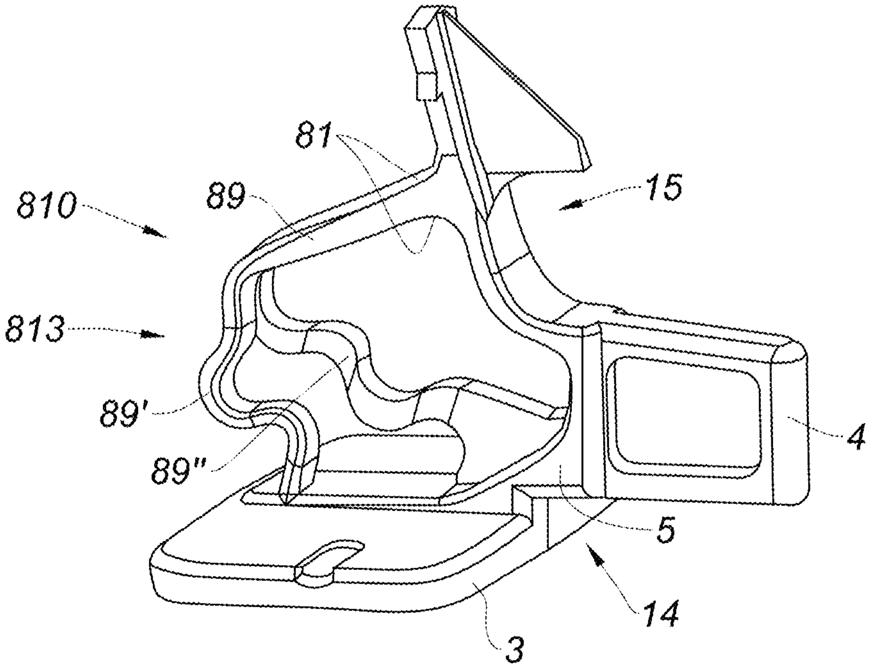
FIG. 15 is a representation in perspective of an eighth embodiment of a device according to the invention.

FIG. 15 is a perspective representation of an eighth embodiment of a device 810 according to the invention. The device 810 has a body 14, an abutment 4 and a retaining means 15 identical to device 1. Only the elastic deformation element 813 differs from device 1.

The elastic deformation element 813 is connected on the one hand to the tab 6 by two fillets 81, and on the other hand to the body 14 in two zones. The first zone is located on the base 3 of the body 14, the second zone is located at the intersection between the base 3 and the junction part 5.

The deformation element 813 comprises a first curved element 89' and a second curved element 89' which are configured to distribute part of the stresses applied to the elastic deformation element 813 when placed in the ajar position or in the opening position of the device 810. The curved elements 89', 89" are positioned between a segment 89 and the second zone. The curved elements 89', 89" comprise an alternation of a plurality of concave elements and convex elements with respect to a plane in which the curved element 89', 89" in question extends. The curved elements 89', 89" each form a spring.

Figure 16:
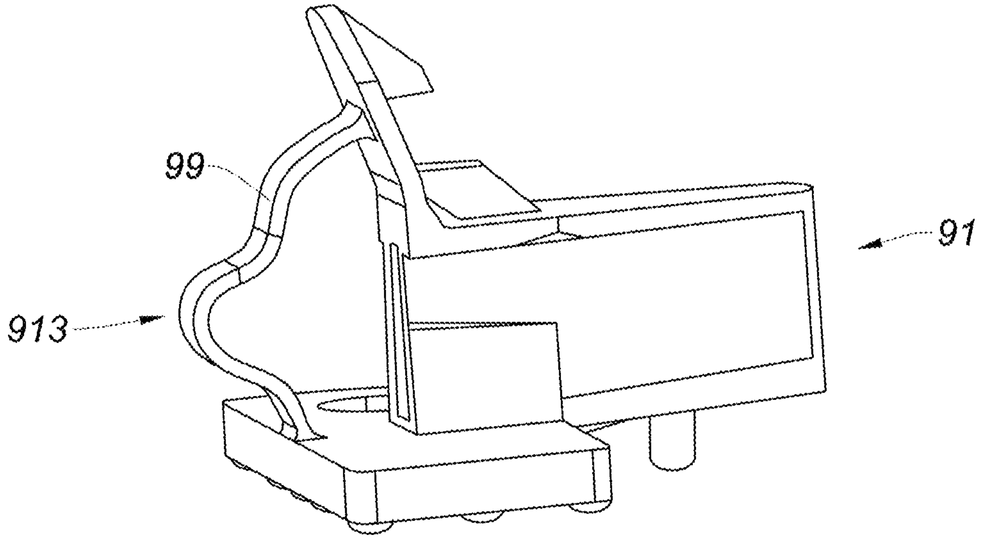
FIG. 16 is a representation in perspective of a ninth embodiment of a device according to the invention.

FIG. 16 is a representation in perspective of a ninth embodiment of a device 91 according to the invention. The device 91 differs from device 41 by the deformation element 913.

The deformation element 913 is formed entirely by a curved element 99 configured to distribute part of the stresses applied to the elastic deformation element 913 when placed in the ajar position or in the opening position of the device 91 The curved element 99 comprises an alternation of a plurality of concave elements and convex elements with respect to a plane in which the curved element 99 extends. The curved element 99 forms a spring.

Figure 17:
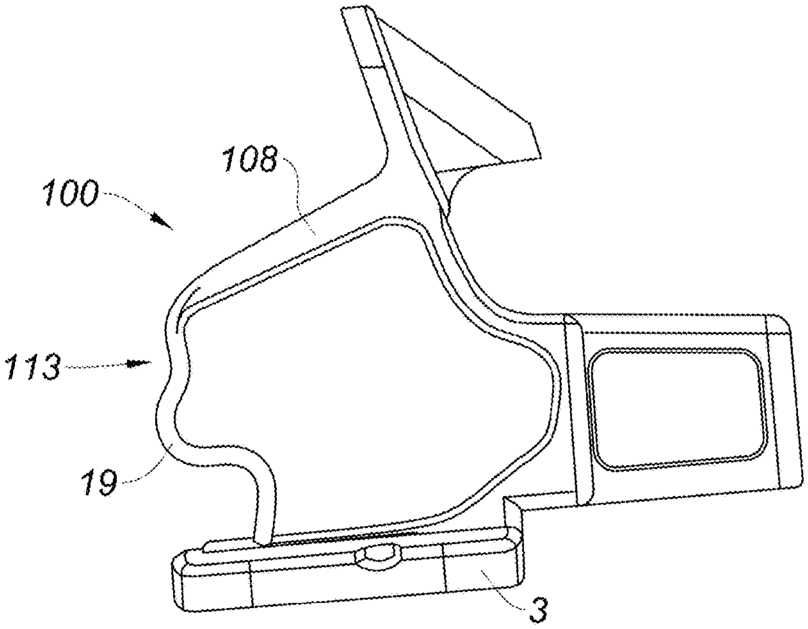
FIG. 17 is a lateral representation of a tenth embodiment of a device according to the invention.

FIG. 17 is a lateral representation of a tenth embodiment of a device 100 according to the invention. The device 100 differs from the device 21 by the deformation element 113.

The deformation element 113 comprises a curved element 19 configured to distribute part of the stresses applied to the elastic deformation element 113 when placed in the ajar position or in the opening position of the device 100. The curved element 19 is positioned between a first segment 108 and the base 3. The curved element 19 comprises an alternation of a plurality of concave elements and convex elements with respect to a plane in which the curved element extends 19.

The curved element 19 forms a spring.

Figure 18:
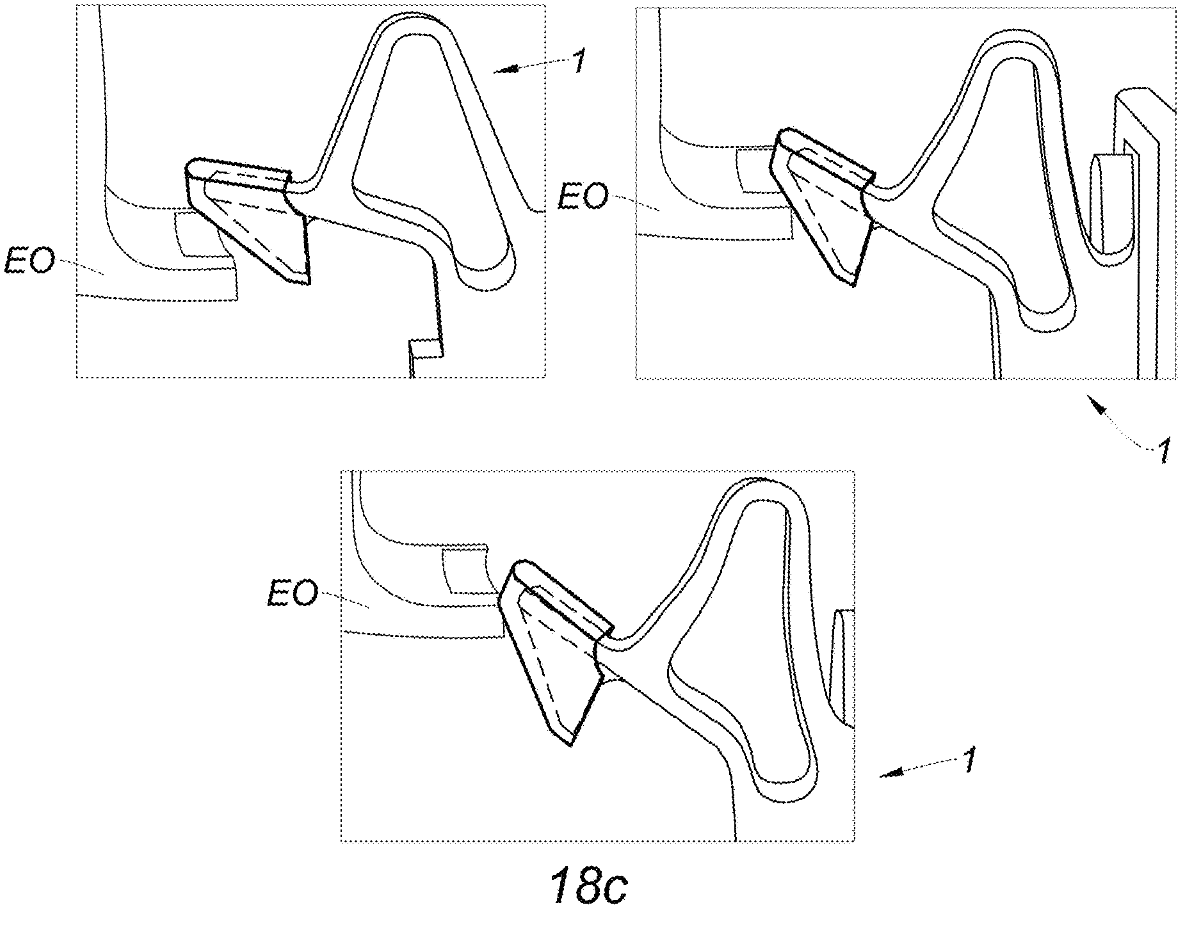
FIG. 18 is a kinematic view of the device according to the first embodiment when placed in the ajar position.

FIG. 18 illustrates three kinematic views of the device 1 according to the invention when a hook EO representing the opening element and subsequently called the opening element EO is approached from a fixed element so as to be placed in an ajar position, that is to say when the opening element moves from an opening position to an ajar position. FIG. 18*a* shows the opening element EO before contact with the tab 6 of the device 1 which is therefore in an opening position, then FIGS. 18*b* and 18*c* illustrate the deformation of the device 1 when the opening element EO is positioned in the ajar position.

Figure 20:
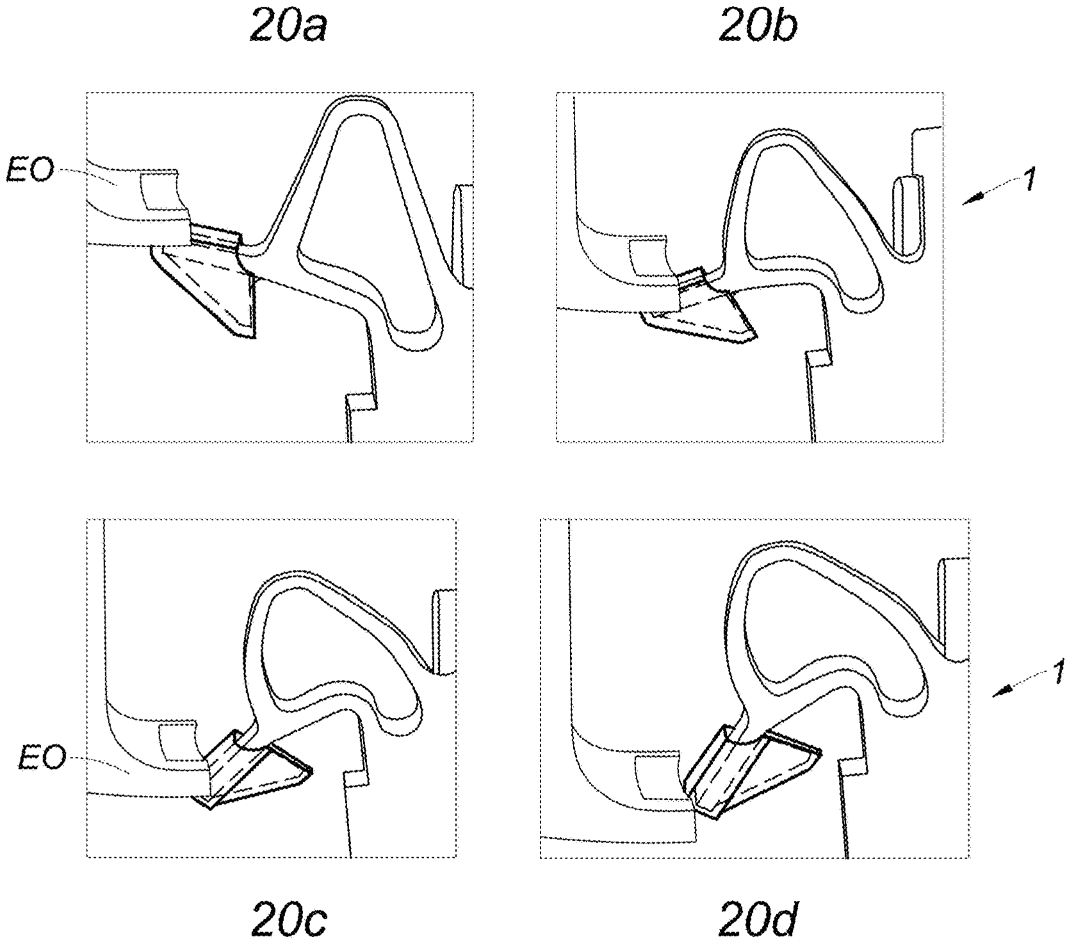
FIG. 20 is a kinematic view of the device according to the first embodiment when placed in the opening position.

FIG. 20 illustrates four kinematic views of the device 1 when the opening element EO is moved away from the fixed element so as to be placed in an opening position. FIG. 20*a* shows the opening element EO in the ajar position, then FIGS. 20*b*, 20*c* and 20*d* illustrate the deformation of the device 1 when the opening element EO passes from the ajar position to the opening position.

Figure 19:
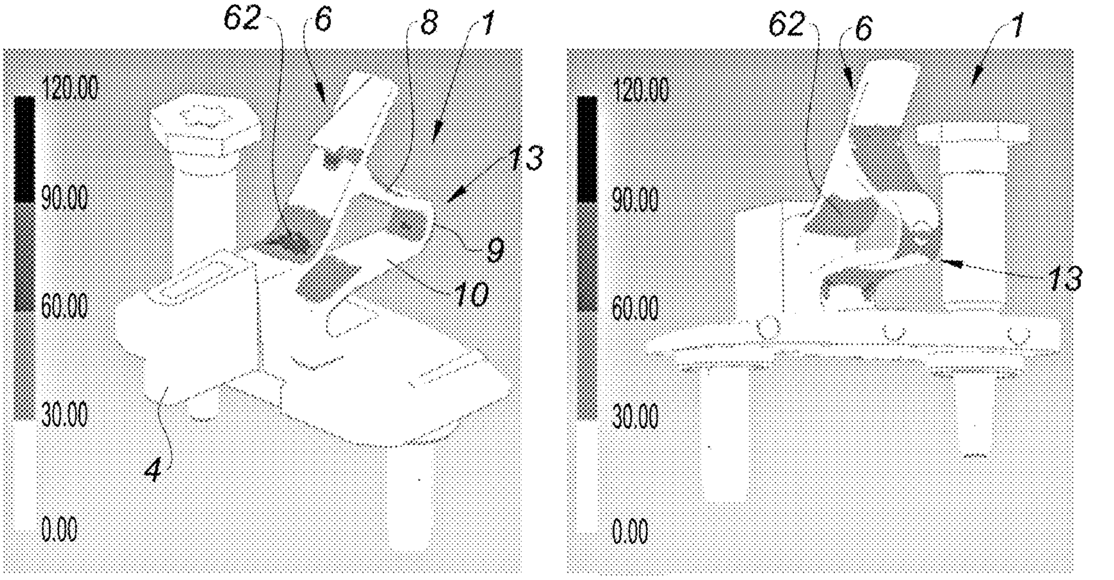
FIG. 19 is a view of the stresses, according to the criteria of Von Mises, in MPa exerted on the device according to the first embodiment when placed in the ajar position.
Figure 21:
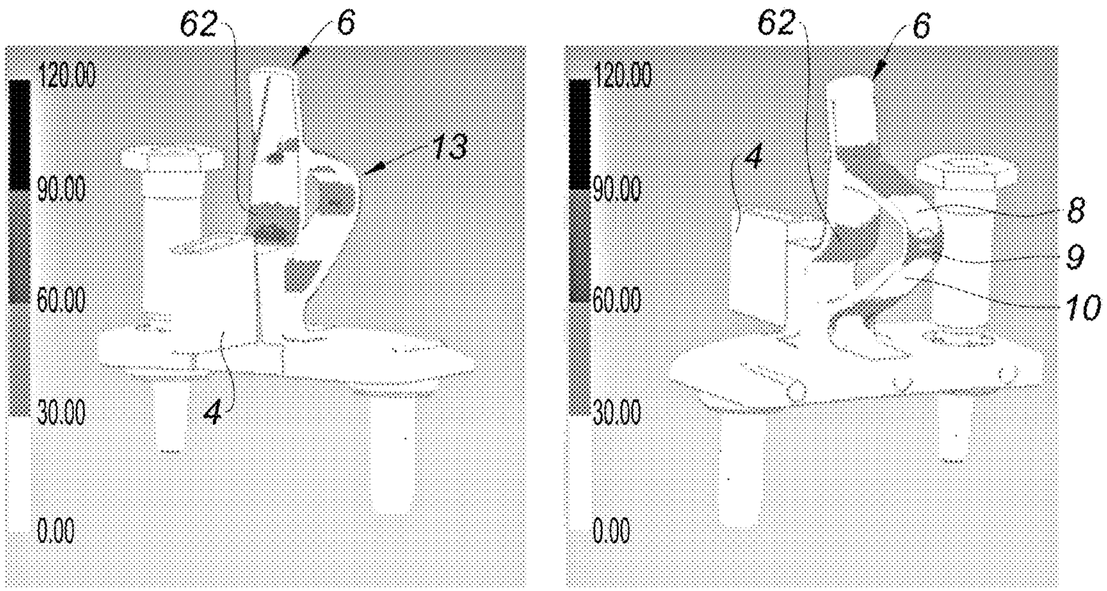
FIG. 21 is a view of the stresses, according to the criteria of Von Mises, in MPa exerted on the device according to the first embodiment when placed in the opening position.

FIGS. 19 and 21 represent the stresses (according to the criteria of Von Mises) in MPa exerted on the device 1 during a representative simulation of a placing in the ajar position and during a setting in the opening position, corresponding to a determined displacement, of the tab 6 of the device 1.

During the elastic deformation associated with placing it in the ajar position, the tab 6 bends at the level of the intermediate zone 62 so as to move away from the abutment 4.

During this movement, the elastic deformation element 13 deforms so that the first segment 8 approaches the second segment 10, the curved element 9 distributing part of the stresses applied to the elastic deformation element 13.

For example, for a displacement of the given tab, as represented in FIGS. 19 and 21, the stress level remains below 90 MPa throughout the device 1 whereas it was between 90 and 120 MPa in the device 1' of the state of the art subject to the same predetermined movement of the tab. More precisely, the maximum stress level is reached in the section of the intermediate zone 62 and at the level of the curved element. The stresses are distributed more homogeneously in the device 1.

The opening element 52, by abutting against the abutment 4 of the device 1 cannot therefore take a completely closed position and the retaining means prevents it from taking a completely opening position. The opening element 52 is therefore in an ajar position.

During the elastic deformation associated with placing it in the opening position, the tab 6 bends at the level of the intermediate zone 62 so as to approach the abutment 4. During this movement, the elastic deformation element deforms so that the first segment 8 moves away from the second segment 10, the curved element 9 distributing part of the stresses applied to the elastic deformation element 13. The level of the stresses remains below 90 MPa throughout the device 1 while it was comprised between 90 and 120 MPa in the device 1' of the state of the art. More precisely, the maximum stress level is reached in the section of the intermediate zone 62 and at the level of the curved element. The stresses are distributed more homogeneously in the device 1.

The stresses applied to the section and to the elastic deformation element are distributed so that the maximum level of stress applied to the device 1 is reduced and cannot lead to breakage of the device 1.

A geometry of the device 1 optimizes and homogenizes the distribution of energy in the device 1 so as to minimize the probability of a fatigue crack appearing at the level of the second end 61 of the tab 6 at the junction with the body 14 and at the junction of the elastic deformation element 13 and the body 14.

A fatigue phenomenon, appearing when the device 1 is repeatedly subjected to a high level of stress, appears later than in a device 1' of the state of the art, or even does not appear.

A usage time of the device is thus prolonged.

Of course, the invention is not limited to the embodiments described and shown in the appended figures. Modifications remain possible, in particular from the point of view of the constitution of the various elements or by substitution of technical equivalents, without thereby departing from the scope of protection of the invention.

The invention claimed is:

1. A temporary device for holding an opening element in an ajar position relative to a fixed element of a vehicle bodywork, comprising a body provided with at least one mounting means, and a retaining means comprising a tab, wherein the tab comprises a first end designed to cooperate with a first flange of a housing, the housing being directly integrated on the opening element or the fixed element of the bodywork or being positioned on an interface which will be fixed to the bodywork, an abutment configured to cooperate with a second flange of the housing, a second end which provides a junction to the body and is connected to the body so that the second end is oriented along an axis of elongation of the abutment, and an intermediate zone, disposed between the first end and the second end, comprising at least one section that is curved and configured to distribute stresses applied to the tab when placing the device in the ajar position or in the opening position, the section being designed to receive and absorb most of the stresses absorbed by the tab.

2. The temporary holding device according to claim 1, wherein the section has a concave shape with respect to a plane in which the tab extends.

3. The temporary holding device according to claim 1, wherein the section has a convex shape relative to a plane in which the tab extends.

4. The temporary holding device according to claim 1, further comprising at least one elastic deformation element which is connected to the tab and the body.

5. The temporary holding device according to claim 4, wherein the elastic deformation element comprises at least one curved element configured to absorb part of the stresses applied to the elastic deformation element when placed in the ajar position or in the opening position of the device.

6. The temporary holding device according to claim 5, wherein the curved element is positioned between a first segment and a second segment so as to form a gripper.

7. The temporary holding device according to claim 5, wherein the curved element comprises at least one alternation of a concave element and a convex element with respect to a plane in which the curved element extends.

8. The temporary holding device according to claim 4, wherein the elastic deformation element is connected to the body at a distance from the junction between the second end of the tab and the body.

9. The temporary holding device according to claim 4, wherein the elastic deformation element, the body and the tab delimit an outline of a recessed closed surface.

10. A vehicle comprising at least one of the temporary holding device according to claim 1.

* * * * *